(12) United States Patent
Lake

(10) Patent No.: US 12,146,515 B2
(45) Date of Patent: Nov. 19, 2024

(54) CONNECTOR

(71) Applicant: BUG GRIP LIMITED, London (GB)

(72) Inventor: Jennifer Lake, Greater London (GB)

( * ) Notice: Subject to any disclaimer, the term of this patent is extended or adjusted under 35 U.S.C. 154(b) by 0 days.

(21) Appl. No.: 18/579,357

(22) PCT Filed: Jul. 11, 2022

(86) PCT No.: PCT/IB2022/056392
§ 371 (c)(1),
(2) Date: Jan. 14, 2024

(87) PCT Pub. No.: WO2023/285948
PCT Pub. Date: Jan. 19, 2023

(65) Prior Publication Data
US 2024/0263655 A1    Aug. 8, 2024

(30) Foreign Application Priority Data
Jul. 15, 2021 (GB) ..................................... 2110183

(51) Int. Cl.
*F16B 2/10* (2006.01)
*B62B 9/26* (2006.01)

(52) U.S. Cl.
CPC .................. *F16B 2/10* (2013.01); *B62B 9/26* (2013.01)

(58) Field of Classification Search
CPC ........ F16B 2/10; F16B 2/04; Y10T 24/44513; Y10T 24/44521; Y10T 24/44368
See application file for complete search history.

(56) References Cited

U.S. PATENT DOCUMENTS 2,917,800 A * 12/1959 Gee ........................ B44D 3/123
                                                        279/107
4,702,447 A    10/1987 Westwood, III
(Continued)

FOREIGN PATENT DOCUMENTS

CN    209634550 U    11/2019
CN    201573690 U    11/2021
(Continued)

OTHER PUBLICATIONS

"Combined Search and Examination Report under Sections 17 & 18(3)" in GB2110183.7 dated Nov. 12, 2021.
"Patents Act 1977: Search Report under Section 17" in GB2110183.7 dated Nov. 11, 2021.
(Continued)

*Primary Examiner* — Robert Sandy
(74) *Attorney, Agent, or Firm* — William H. Bollman

(57) ABSTRACT

A connector for fitting and removing, without use of tools. The connector has first and second closable jaws. Each jaw is adapted to close around an item or unit, the jaws are connected together by way of a bar, at least one of the jaws is rotatable with respect to the bar and has a twist lock closure means which comprises two relatively rotatable parts. When rotated in a first sense the rotatable parts engages a lock means which prevents the jaws from opening by arresting a ratchet and pinion in place. When rotated in an opposite sense the lock means unlocks the jaws. The jaws are sprung apart by a resilient means which includes at least one O-ring which, when in a relaxed (unstretched) state retains the jaws in an open configuration.
The connector includes an attachment member that is sufficiently firm and stable, for the attachment of at least two units, such as push chairs.

16 Claims, 13 Drawing Sheets

(56) References Cited

U.S. PATENT DOCUMENTS

| | | | |
|---|---|---|---|
| 5,096,150 | A | 3/1992 | Westwood |
| 5,522,121 | A | 6/1996 | Fraynd et al. |
| 5,918,892 | A | 7/1999 | Aaron et al. |
| 7,708,736 | B2 * | 5/2010 | Mullaney ........... A61B 17/6466 606/54 |
| 8,671,530 | B2 * | 3/2014 | Ciminski ........... A63B 21/0728 24/494 |
| 2008/0122200 | A1 | 5/2008 | Lake |
| 2016/0355205 | A1 * | 12/2016 | Upton ................... F16M 11/08 |

FOREIGN PATENT DOCUMENTS

| | | | | |
|---|---|---|---|---|
| GB | 2420531 | A * | 5/2006 | ............. B62B 7/008 |
| GB | 2608857 | B | 11/2023 | |

OTHER PUBLICATIONS

"Patents Act 1977: Combined Search and Examination Report under Sections 17 and 18(3)" in GB2110183.7 dated Nov. 12, 2021.
Applicant Response Letter in GB2110183.7 dated Jul. 4, 2022.
Applicant amended spec and claims in GB2110183.7 dated Nov. 12, 2021.
Applicant Response Letter in GB2110183.7 dated Aug. 5, 2022.
Applicant amended spec and claims in GB2110183.7 dated Aug. 5, 2022.
"Patents Act 1977: Intention to Grant under Section 18(4)" in GB2110183.7 dated Aug. 31, 2023.
"Patents Act 1977: Examination Report under Section 18(3)" in GB2110183.7 dated Aug. 5, 2022.
"International Search Report" in PCT/IB2022/056392 dated Oct. 11, 2022.

* cited by examiner

CONNECTOR

FIELD

The present invention relates to a connector for connecting together items or units, for example pushchairs or prams or buggies, or other items of same or similar size.

BACKGROUND

It is often desirable to connect items together in a temporary manner so that they can subsequently be disconnected one from another but whilst connected, may be moved or placed together for use or convenience.

Often conventional connectors were complex or required machines.

PRIOR ART

An example of an existing connector is shown in international patent application WO-A1-2006/056795 (Jennifer LAKE). The connector shows a connector with two gripping members for gripping together two perambulators.

Chinese utility model CN201573690 (Deliang) discloses a clamp that is capable of flexibly which comprises an upright rod, a chuck positioned at its lower end and a joint with an upper free end used for connecting objects such as a sunshade on a baby carriage.

Chinese utility model CN 209634550 (Deng) discloses a baby stroller connecting device comprising a connecting rod and a nut. Two ends of the connecting rod are respectively sleeved and a connecting rod and clamp are arranged on the sleeve. Clamps are arranged at each end adjustable. Locking wrenches are arranged on the left and right sides of the central part of the clamp and used for adjusting the length of the central connecting rod.

U.S. Pat. No. 4,702,447 (Westwood) discloses a clamp device for interconnecting two entities. The clamp device includes a stem and a plurality of jaws connected to the stem, a hand manipulated nut threaded on the stem for causing the jaws to engage and to be connected to one of the two entities and means on the other end of the stem to engage and be connected to the other of the entities.

U.S. Pat. No. 5,522,121 (Fraynd) discloses a device for engaging and disengaging two baby strolling devices which consists of two components spaced apart and coupled by a snap release connector. When mounted between the frames of the baby strolling devices the device allows one person to operate the two strolling devices simultaneously.

Although successful, there were some drawbacks with the aforementioned connector. For example there was a risk that when connecting delicate or fragile items, that the connector crushed or damaged them.

The present invention seeks to overcome those drawbacks by providing an improved connector.

SUMMARY OF THE INVENTION

According to a first aspect of the invention, there is provided connector which has first and second closable jaws, each jaw is adapted to close around an item or unit, the jaws are connected together by way of a bar, at least one of the jaws is rotatable with respect to the bar and has a twist lock closure means which comprises two relatively rotatable parts which when rotated in a first sense engages a lock means and prevents the jaws from opening by arresting a ratchet and pinion in place, and when rotated in an opposite sense unlocks the jaws; wherein the jaws are sprung apart by a resilient means which includes at least one O-ring which, when in a relaxed (unstretched) state retains the jaws in an open configuration.

Ideally at least one of the jaws is adapted to rotate through at least 180°, and preferably to rotate through 360°.

In some embodiments of the connector, the jaws have resiliently deformable pads located on inner surfaces thereof which compress to grip the item or unit and thereby avoid scratching or damaging fine paintwork or delicate surfaces.

The fact that the connector operates so that its jaws can be closed to lock around a range of sizes of tube, and which has a twist lock closure means, ensures that when locked the twist lock closure means prevents the jaws from opening. This twist lock closure means provides an additional security means to prevent the jaws from being tampered with or accidentally opening. Thus this twist lock mechanism ensures that for example a child in a buggy cannot unlock the connector and so it acts as an anti-tamper device.

The twist lock closure means is provided for locking at least one of the jaws in a closed, or in an open, configuration. The twist lock closure means includes a rotatable means, which when rotated in a first direction, locks the jaws, and when rotated in a second direction, unlocks the jaws.

In some embodiments of the connector an outer portion of the twist lock closure means is in the form of a protective shell which surrounds at least part of the jaws.

Preferably the protective shell is in the form of a pair of scallops. Ideally the pair of scallops have helical pathways formed on inner surfaces thereof, along which guide pins pass when the rotatable means is rotated.

An adjuster permits a spacing between the first and the second closable jaws to be varied, for example by way of a threaded shaft portion.

In a preferred embodiment at least one resilient metal spring, configured to separate the jaws from a closed configuration, by pivoting the jaws around a pair of hinge pins.

An adjustment means may have an adjustable catch mechanism which ideally also includes a haptic and/or audible click device to indicate closing and/or opening of the jaws.

Components are preferably provided in a modular and are adapted to inter-connect one with another by way of push-fit connection means thereby enabling disassembly for repair or cleaning.

Jaws are shaped and dimensioned to grip a tube or pipe which is substantially round in cross section with a diameter of between 20 mm to 50 mm.

Ideally jaws are dimensioned so that the jaws can close without revealing any finger traps or areas for significant foreign body ingress.

Components are preferably formed from a single type of polymer for contamination free single polymer recycling.

A flat area is defined on the rod which connects the jaws for receiving a branding or a retro reflective panel. An aperture may be arranged to receive a flexible cord or tie for semi-permanent attaching the connector to the unit. For the purpose of theft prevention Novelty features, such as faces or names or cartoon images, may be applied to the first and second protective shells so as to decorate them, for example adhesive eyeball stickers may be applied so as to decorate the connector.

It is appreciated that the connector may be fitted and removed without use of tools. The connector may include an attachment member that is sufficiently firm and stable, in use in order, for the attachment of at least two units one to another.

A resiliently deformable pad member is preferably provided wherein the attachment member is adapted to provide increased grip, to the connecter, by compliance, in use, to a surface of the unit and the connector, and increased friction is achieved therebetween.

The invention enables a jaw member to apply a clamping force to a curved surface via the connector.

In some embodiments, the unit is a pushchair or a scooter.

In some embodiments, the connector further includes a first and a second recess member which comprises a bias member and/or a groove member for connecting a first pushchair to a second pushchair at respective locations at the first pushchair and the second pushchair.

In some embodiments, the first pushchair is connected to the second pushchair in at least: a matrix configuration; and a series configuration.

In some embodiments, the jaws comprises one or more jaw liners to prevent damage to an aesthetic finish of the item to which the connector is attached. The jaw liners ideally include a resiliently deformable material, such as a synthetic foam or similar material, such as Neoprene®.

Therefore in some embodiments, the jaw liners prevent damage to a paint coating, polish or surface finish of the connector.

In some embodiments, the connector further comprises haptic feedback means for a soft feedback to indicate when the connecter is deployed.

In some embodiments, the haptic feedback means comprises a regulatory haptic click to provide feedback to the user that the connector is secured to the at least two units.

In some embodiments, the connector further comprises an audible click feedback unit to give feedback that the connector is secured to the at least two units.

Embodiments of the present invention will now be described, by way of example only, with reference to the drawings in which:

DETAILED DESCRIPTION OF PREFERRED EMBODIMENTS OF THE INVENTION

Figure 9:
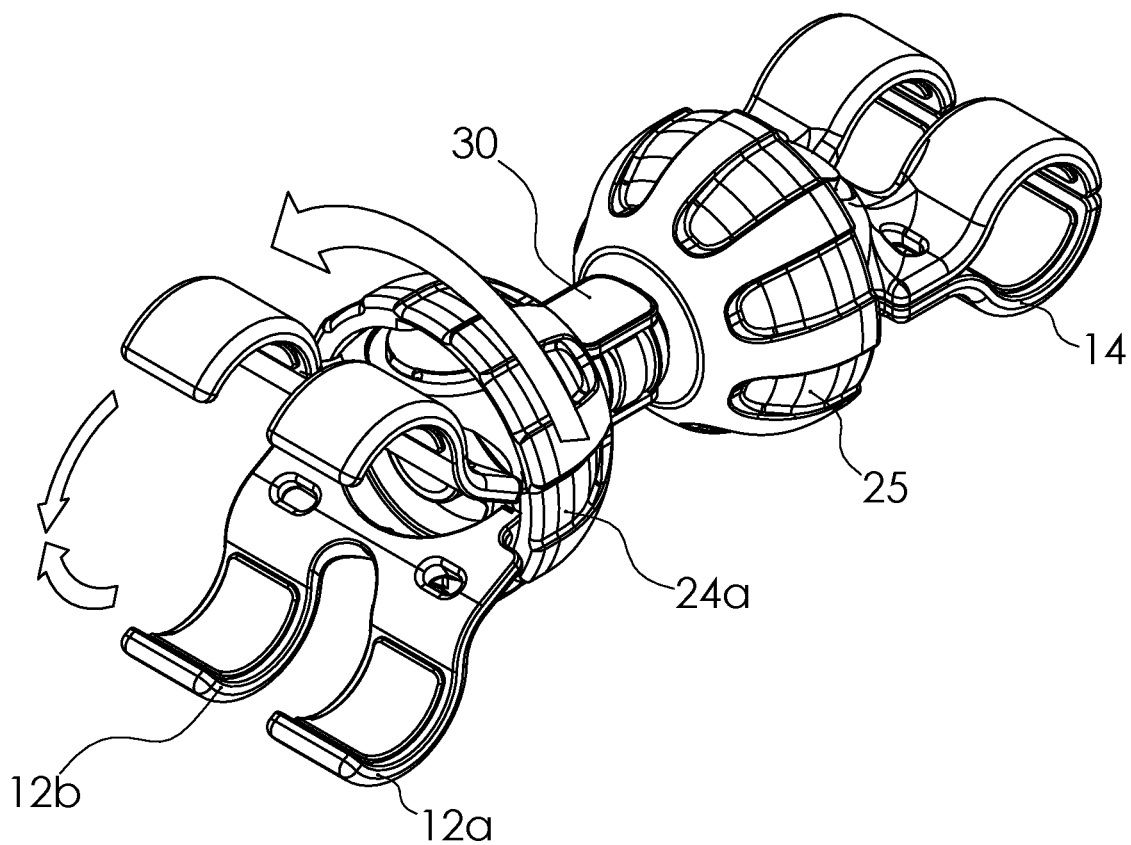
FIG. 9 shows an overall isometric view of the connector from above with one jaw open and indicates how the open jaw is capable of twisting with respect to the closed jaw.
Figure 10:
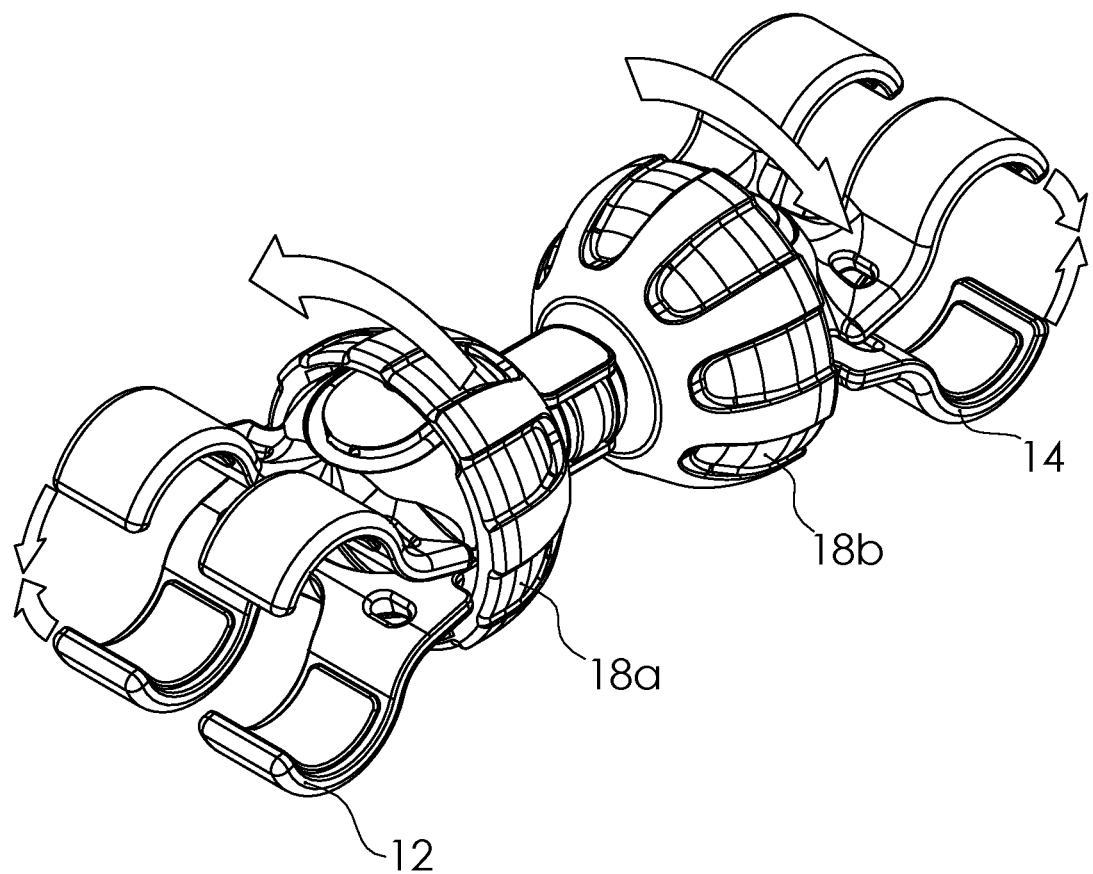
FIG. 10 shows an overall isometric view of the connector from above with both jaws open and indicates how the jaws twist with respect one to another.

Referring to the Figures there is shown a connector 10 which has a first closable jaw 12a, 12b (collectively 12) and a second closable jaw 14a, 14b (collectively 14), each of which is adapted to close around an item or unit (not shown). The jaws 12, 14 are connected together by way of a bar 16. At least one of the jaws 12, 14 is rotatable with respect to a longitudinal axis of the bar 16 (shown for example in FIG. 9) and twist lock closure means 18a, 18b are provided to lock each of the jaws 12, 14, as shown for example in FIG. 10.

Figure 1:
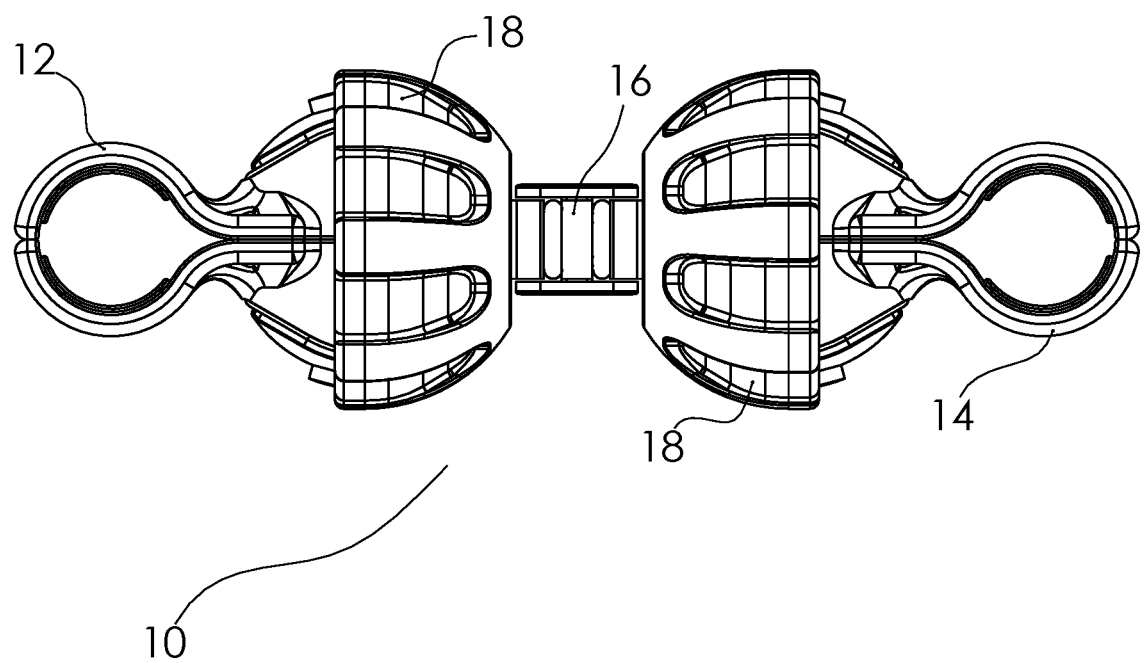
FIG. 1 shows an overall view of the connector with its jaws closed.
Figure 2:
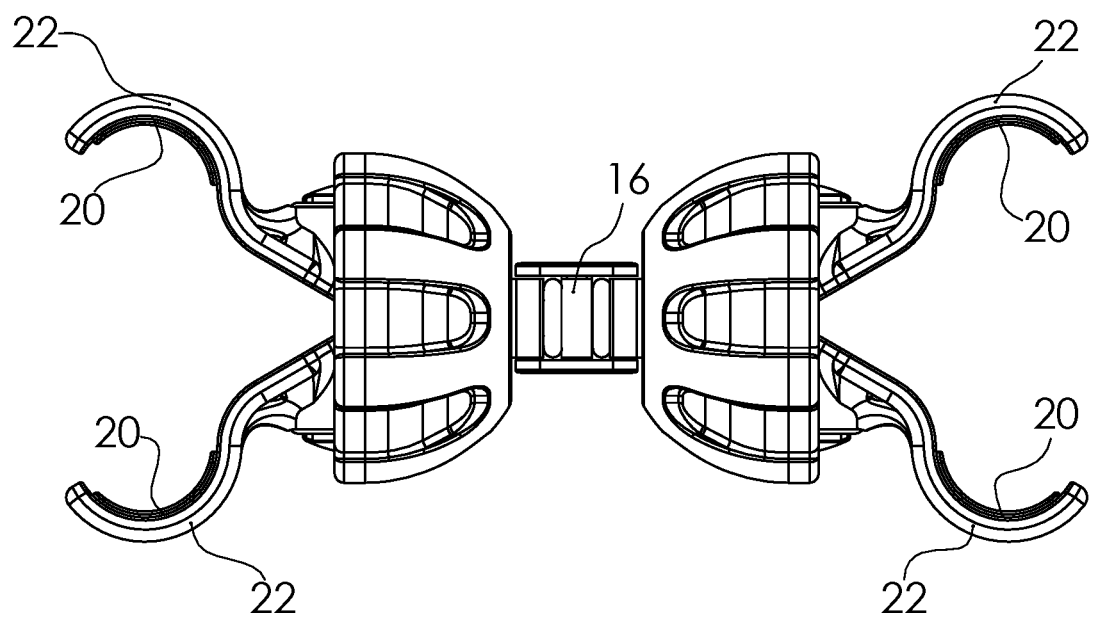
FIG. 2 shows an overall view of the connector with its jaws open.

Resiliently deformable pad members 20 are fitted to inner surfaces of each of resiliently deformable attachment members 22, as shown in FIG. 2. Each attachment member 22 is adapted to provide increased cushioning and grip, to an item (not shown) being gripped by the connecter, by compliance and because each attachment member 22 is resiliently deformable. The attachment members 22 also act to increase friction between the item being gripped and the jaws 12 of the connecter.

Figure 11:
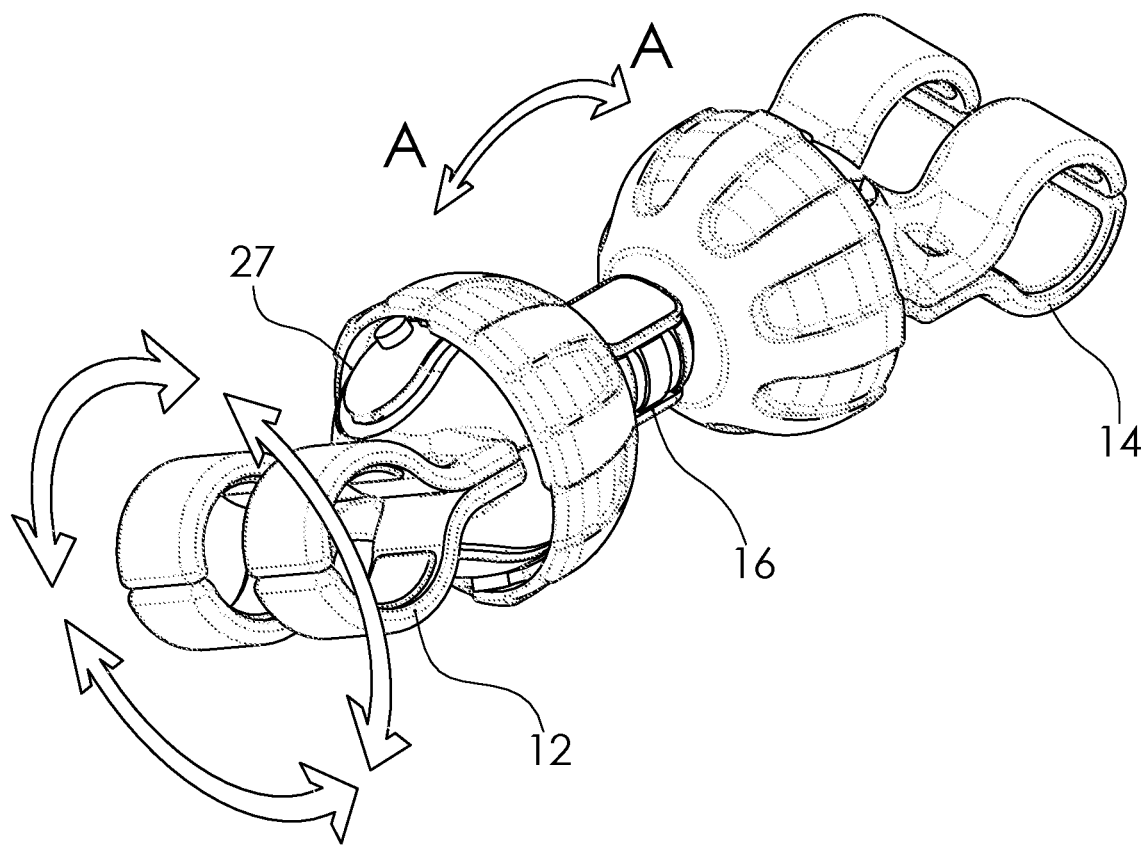
FIG. 11 shows an overall isometric view of the connector from above with both jaws closed and indicates how an interconnecting bar flexes and permits twisting of the jaws.

As shown in FIG. 11, the jaws 12, 14 are adapted to rotate through at least 180°. In one preferred embodiment the jaws 12, 14 are able to rotate through 360°.

Figure 3:
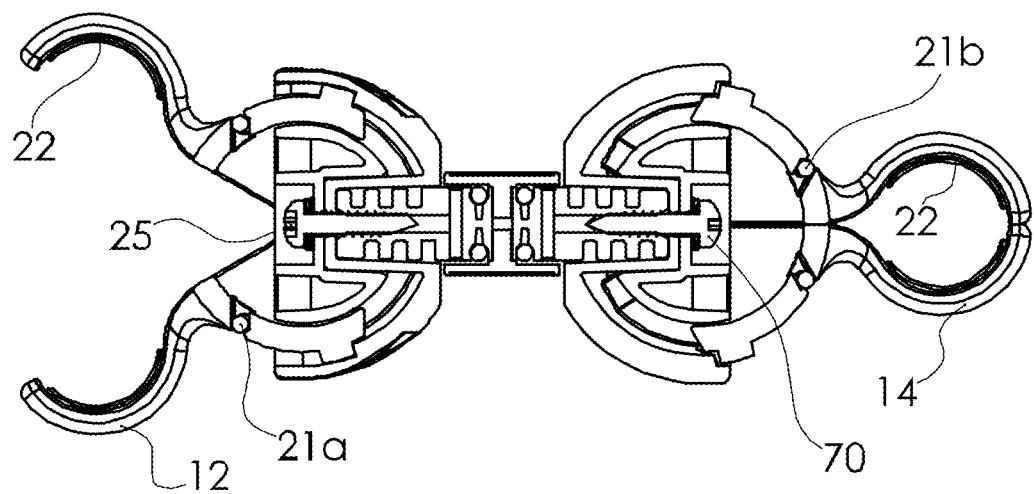
FIG. 3 shows a sectional view through the connector with its jaws closed.

Referring to FIG. 3 the jaws 12, 14 are sprung by a resilient means 21 which is operative to open the jaws 12, 14. The resilient means 21a, 21b includes at least one O-ring which when in a relaxed (unstretched) state, retains the jaws 12, 14 in an open configuration. Therefore the O-ring provides a force which tends to cause jaws to open by causing them to pivot them around a pair of hinge pins and thereby bias the jaws open when in an unstretched state.

Figure 4A:
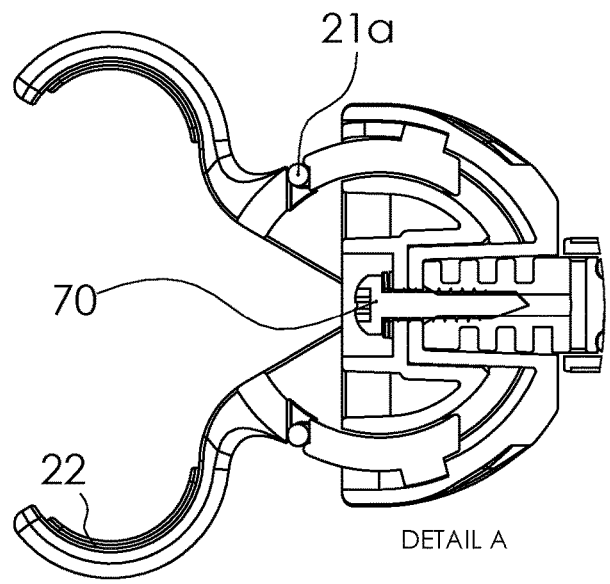
FIGS. 4a and 4b shows a sectional view through a left hand end of the connector with its jaws open.
Figure 4B:
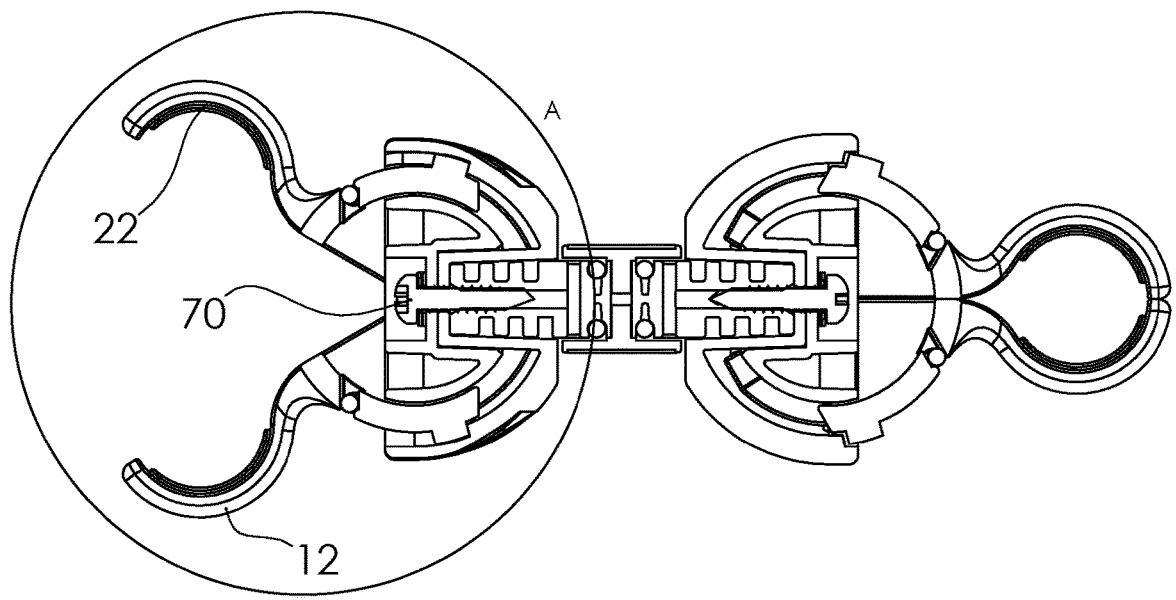

Referring to FIGS. 4 and 5 which show in detail the jaws 12, 14 with the resiliently deformable pads 22 located on their inner surfaces. The resiliently deformable pads 22 are formed from a synthetic sponges and are adapted to grip the item or unit (not shown).

Figure 6:
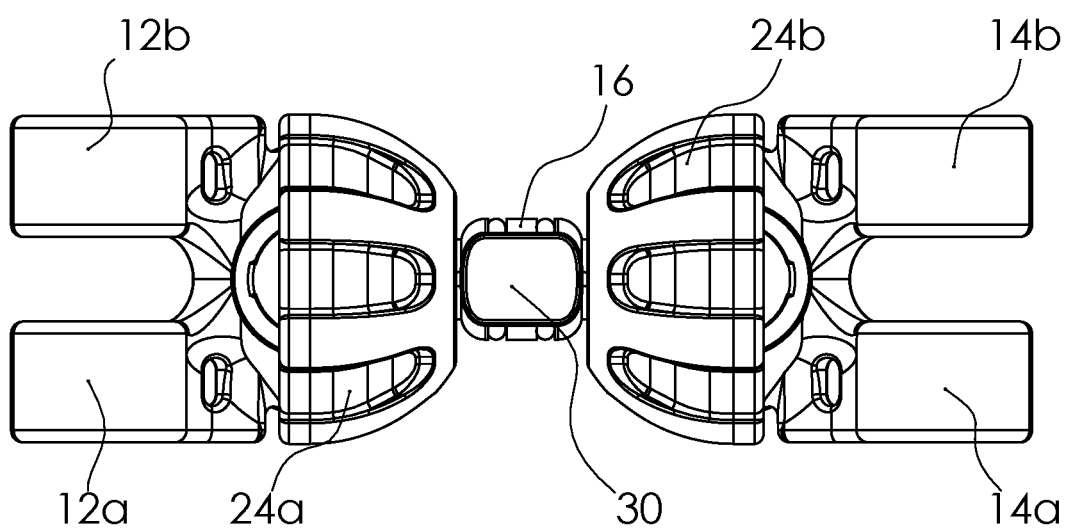
FIG. 6 shows an overall plan view of the connector from above.
Figure 7:
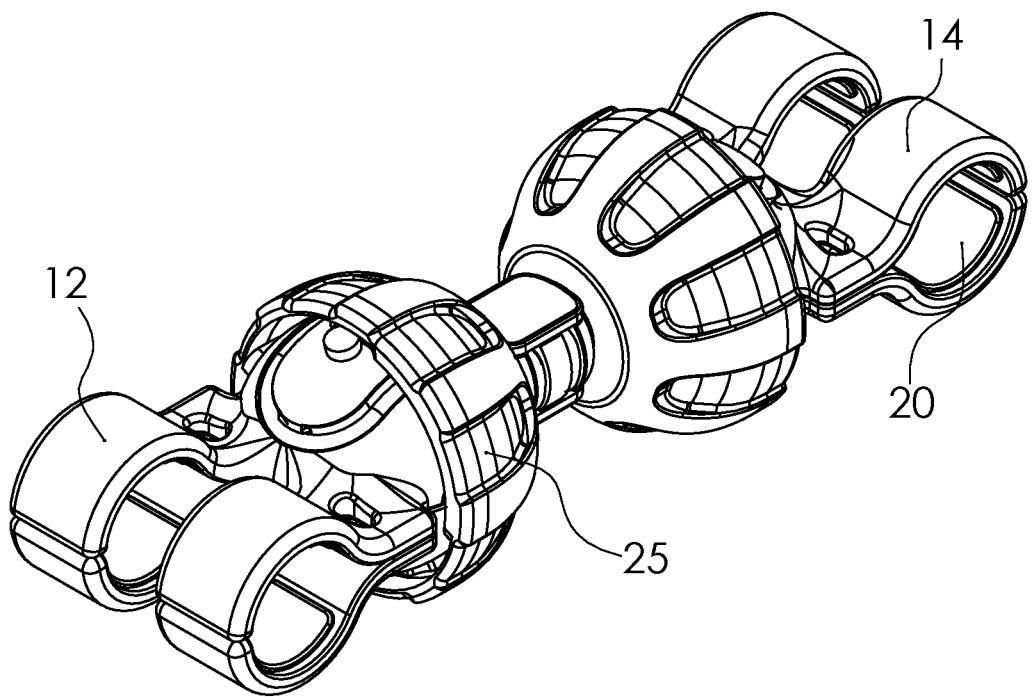
FIG. 7 shows an overall isometric view of the connector from above with its jaws closed.

In FIG. 6 a twist lock closure means 24a, 24b (collectively 24) is provided for locking the jaw 12 in a closed, or in an open, configuration. The twist lock closure means 24 includes a rotatable housing 27 which when rotated in a first direction (FIG. 9), locks the jaw 12, and when rotated in a second direction (FIG. 10), unlocks the jaws 12. An outer portion of the twist lock closure means 24 is in the form of a protective shell which surrounds at least part of the jaws. The protective shell 25 is in the form of a pair of scallops.

There are therefore effectively two different locking mechanisms: the first is the twist lock closure means 24 as mentioned earlier; and a second lock means locks the jaws in a closed, or in an open, configuration so that they grip the item or tube separate. The second lock means includes catches 34a, 34b (collectively 34) which slide and engage with recesses 33a, 33b (collectively 33) when the jaws are unlocked and engage with pawls 36a, 36b (collectively 36) when the jaws 12 are locked, as described below and shown in FIG. 5a.

The pair of scallops have helical pathways (FIG. 11) formed on inner surfaces thereof, along which guide pins pass when the rotatable housing 27 is rotated. Bending along the bar or rod 16 is permitted as indicated by the double-headed arrow A-A.

Figure 12:
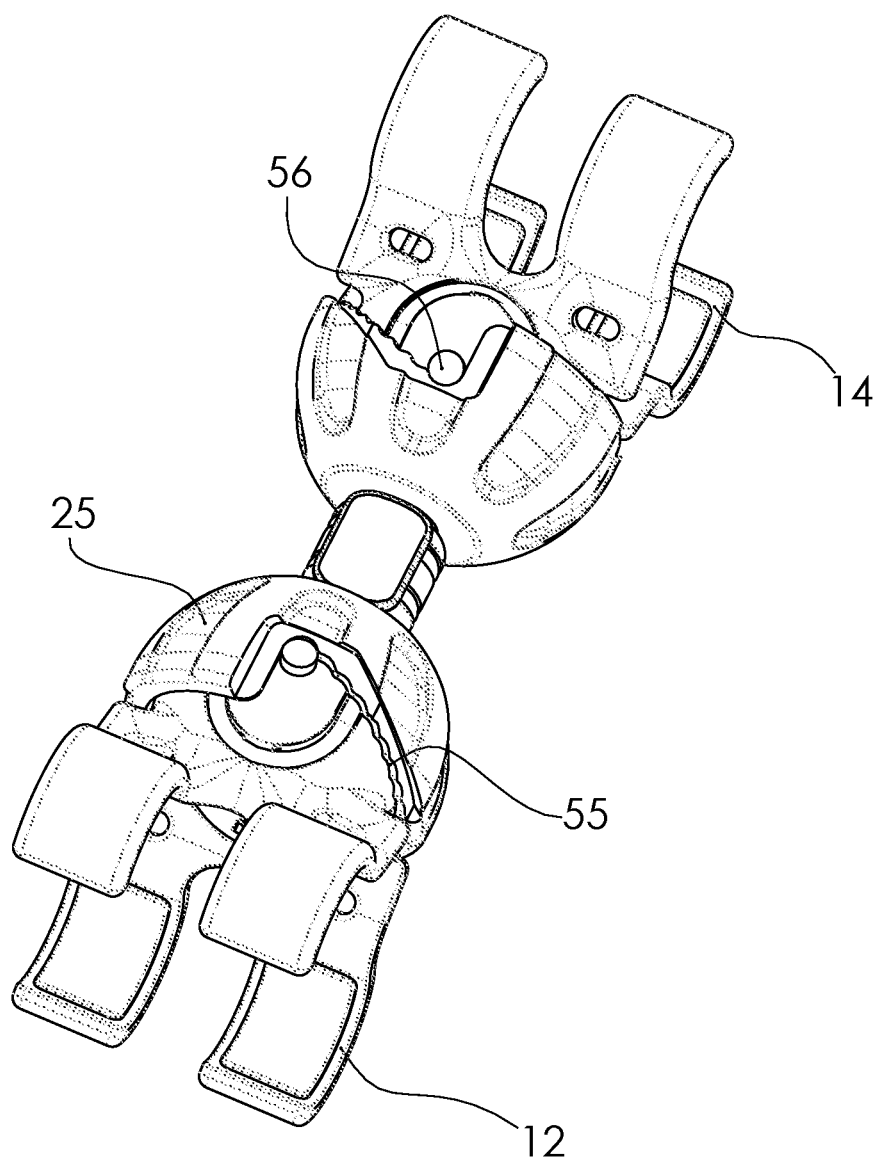
FIG. 12 shows an overall isometric view of the connector from above with both jaws open and indicates how a ratchet and pinion operates to close the jaws close.
Figure 13:
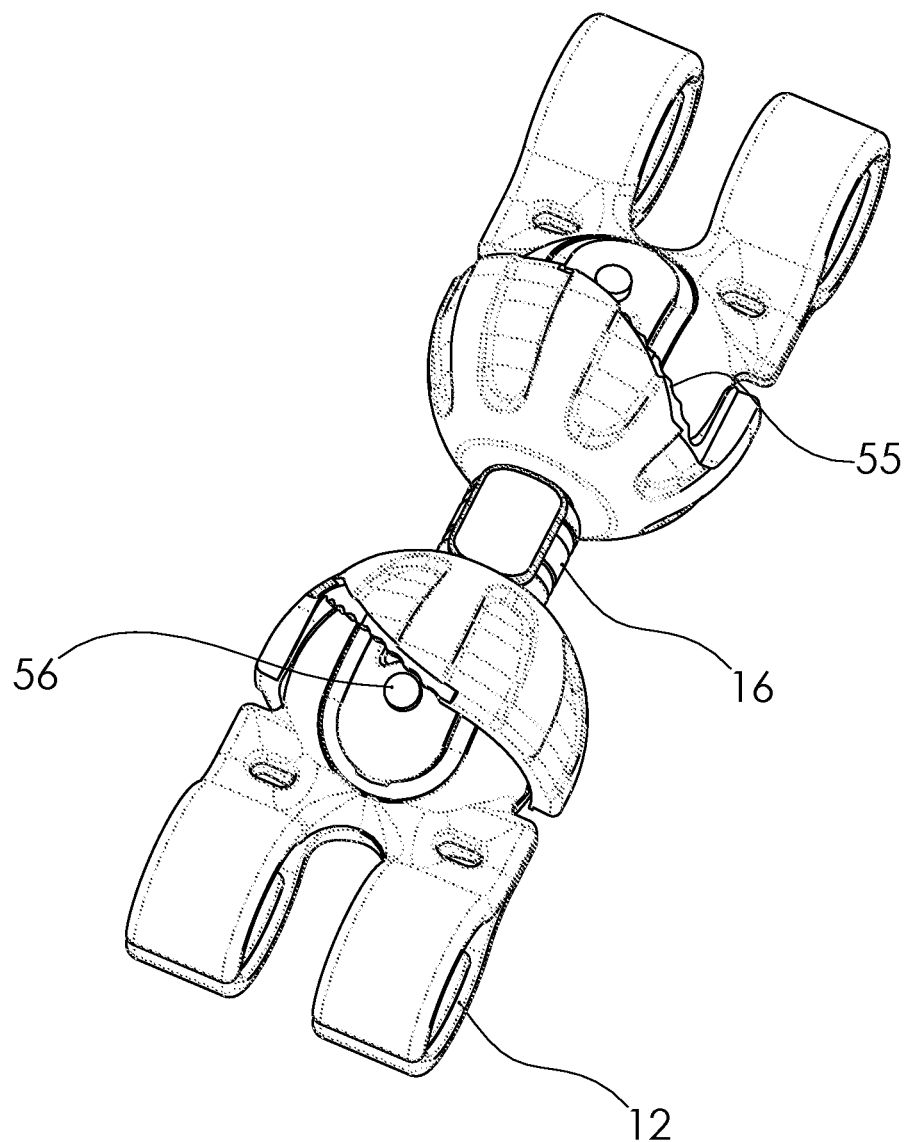
FIG. 13 shows an overall isometric view of the connector from above and indicates how the ratchet and pinion has operated to close the jaws.

Referring to FIG. 12 an adjuster comprises a rack or ratchet 55 is located around an inner peripheral portion of the protective shell 25. A pinion 56 works with the rack or ratchet 55 to permit a spacing between the first and the second parts of each closable jaw 12, 14 to be varied. At least one resilient metal spring (not shown) is configured to separate the jaws from a closed configuration, by pivoting them around a pair of hinge pins. The adjuster ideally has a haptic catch mechanism which is defined by the ratchet 55 and pinion 56 with an audible click to indicate closing and/or opening of the jaws 12, 14. Twisting of the shell 25 causes the jaws to lock by arresting the ratchet 55 and pinion 56 in place and thereby prevents the jaws 12, 14 from opening.

Components are modular and are adapted to inter-connect one with another by way of push-fit connection means thereby enabling disassembly for repair or cleaning. A lock screw 70 is shown which connects the integers together.

Figure 5A:
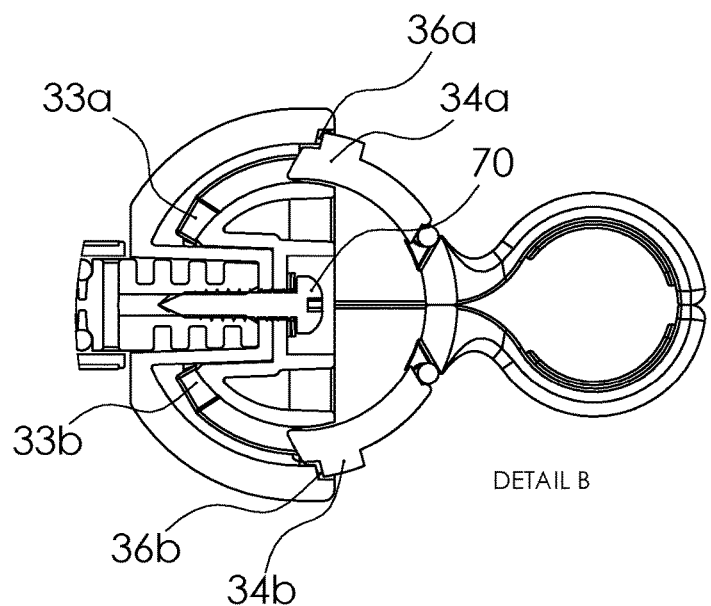
FIGS. 5a and 5b shows a sectional view through a right hand end of the connector with its jaws open.
Figure 5B:
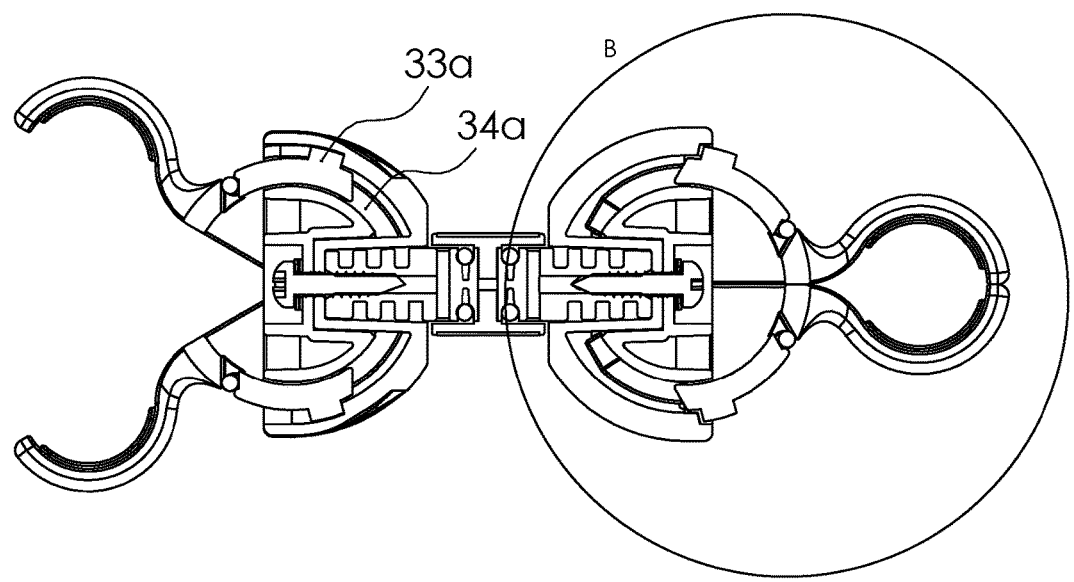

FIGS. 4a and 4b and FIGS. 5a and 5b show how jaws 12 are shaped and dimensioned to grip a tube or pipe (not shown) which is typically round or oval in cross section with a diameter of between 20 mm to 50 mm. The second lock means includes catches 34 that slide and engage with recesses 33 when the jaws are unlocked and engage with pawls 36 when jaws 12 are closed and locked, as shown in FIG. 5a. It is understood that the jaws are closable jaw 12 is also capable of applying a clamping force to a flat surface via the connector.

FIG. 6 shows a flat area 30 that is defined on the rod 16 for receiving a branding (not shown) or a retro reflective panel.

Figure 8:
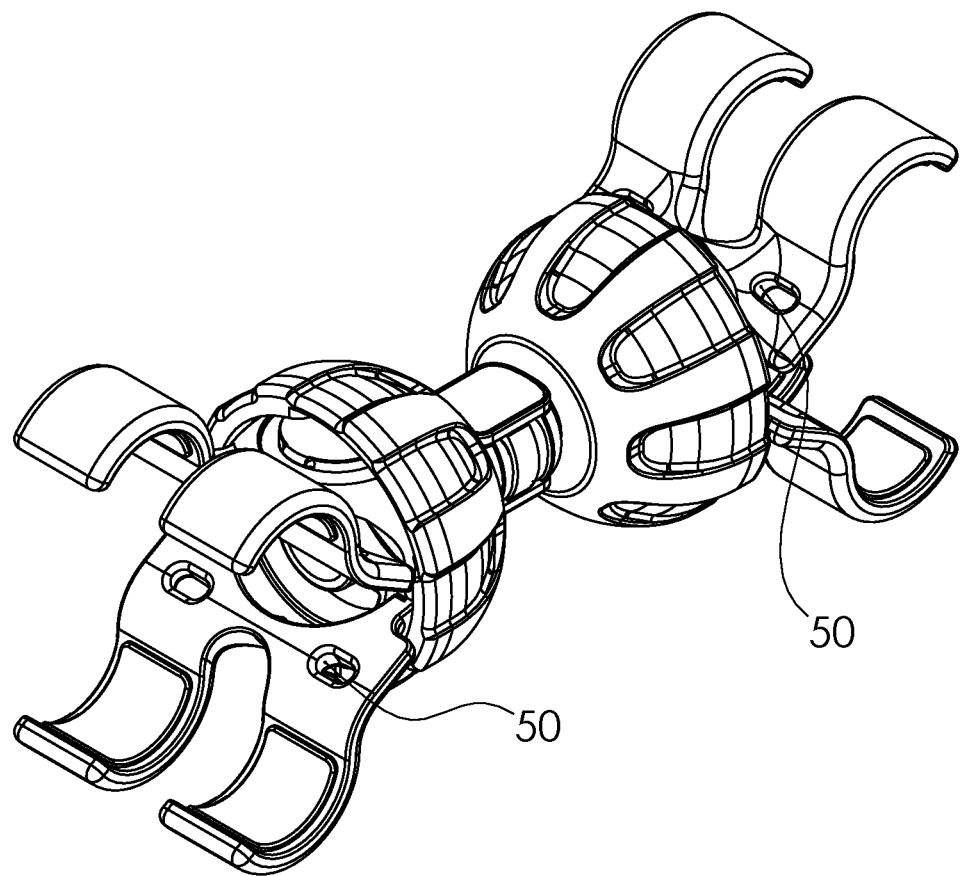
FIG. 8 shows an overall isometric view of the connector from above with its jaws open.

FIG. 8 shows apertures 50 which are arranged to receive a flexible cord or tie (not shown) for semi-permanent attaching the connector 10 to a buggy or other device for the purposes of deterring theft. The first and second protective shells are decorated to resemble eyeballs or other novelty features, such as a face or logo or name.

The components are formed from a single polymer for contamination free single polymer recycling.

In some embodiments, the connector further includes a first and a second recess member, a bias member and a groove member for connecting a first pushchair (not shown) to a second pushchair (not shown) at respective locations at the first pushchair and the second pushchair.

In some embodiments, the first pushchair is connected to the second pushchair in a matrix configuration or as a series configuration.

In some embodiments, the connector further comprises a haptic feedback means for a soft feedback regarding a connecting capability of the connecter.

Once the connecter is fitted to a pushchair the attachment point must be sufficiently firm and stable for the attachment of a second pushchair or scooter While various embodiments of the present invention have been described above, they have been presented by way of example only, and not limitation. It should be apparent that adaptations and modifications are intended to be within the meaning and range of equivalents of the disclosed embodiments, based on the teaching and guidance presented herein.

The elements of the embodiments presented above are not necessarily mutually exclusive, but items may be interchanged to meet various needs as would be appreciated by a person skilled in the art. For example, one or more light emitting diodes (LEDs) (not shown) may be incorporated in the connector with a power supply, such as a battery (not shown). Optionally a flasher unit (not shown) may be provided which enables a user to switch on the LEDs so as to enable the connector to be seen more easily in low light or in the dark.

Although the invention has been described in considerable detail in language specific to structural features, it is to be understood that the invention defined in the appended claims is not necessarily limited to the specific features herein described. Rather, the specific features are disclosed as exemplary preferred forms of implementing the claimed invention.

Variations may be made to the aforementioned embodiments for example by including different ridges or a dimpled or a knurled surface in order to improve grip. This is a benefit to users with limited dexterity or strength or who may be disabled.

Another variation includes having reflectors for improving visibility in dark or in poor weather conditions.

It is to be understood that the phraseology or terminology used herein is for the purpose of description and is not limiting and the scope of protection is defined by the claims.

LIST OF PARTS 12 closable jaw
14 closable jaw
16 bar or rod
18a twist lock closure means
18b twist lock closure means
20 deformable pad member
21 O-ring
22 pad member
24 twist lock closure means
25 protective shell
27 rotatable housing
28 helical pathway
33 recess
34 catch
36 pawl
50 aperture
55 ratchet
56 pinion
70 lock screw

The invention claimed is:

1. A connector has first and second closable jaws, each jaw is adapted to close around an item or unit, the jaws are connected together by way of a bar, at least one of the jaws is rotatable with respect to the bar and has a twist lock closure means which comprises two relatively rotatable parts which when rotated in a first direction engages a lock means and prevents the jaws from opening by arresting a ratchet and pinion in place, and when rotated in an opposite direction unlocks the jaws; wherein the jaws are sprung apart by a resilient means which includes at least one O-ring which, when in a relaxed, unstretched state retains the jaws in an open configuration.

2. A connector according to claim 1 wherein at least one of the jaws is adapted to rotate through at least 180°, and preferably to rotate through 360°.

3. A connector according to claim 1 wherein the jaws have resiliently deformable pads located on inner surfaces thereof which compress to grip the item or unit.

4. A connector according to claim 1 wherein the lock means, comprises catches that slide and engage with recesses when the jaws are unlocked and engage with pawls to lock the jaws in a closed, or in an open, configuration.

5. A connector according to claim 1 wherein an outer portion of the twist lock closure means is in the form of a protective shell which surrounds at least part of the jaws.

6. A connector according to claim 4 wherein the protective shell is in the form of a pair of scallops.

7. A connector according to claim 1 includes an adjuster which permits a spacing between the first and the second closable jaws to be varied.

8. A connector according to claim 1 includes an adjustment means which has a haptic catch mechanism and/or audible click to indicate closing and/or opening of the jaws.

9. A connector according to claim 1 wherein components are modular and are adapted to inter-connect one with another by way of push-fit connection means.

10. A connector according to claim 1 wherein the jaws are shaped and dimensioned to grip a tube or pipe which is substantially round in cross section with a diameter of between 20 mm to 50 mm.

11. A connector according to claim 1 wherein components are formed from a single polymer for contamination free single polymer recycling.

12. A connector according to claim 1 wherein a flat area is defined on the bar for receiving a branding or a retro-reflective panel.

13. A connector according to claim 1 includes an aperture arranged to receive a flexible cord or tie for semi-permanent attaching the connector to the unit.

14. A connector according to claim 4 wherein the first and second protective shells are decorated to resemble eyeballs.

15. A connector according to claim 1 includes a light emitting diode (LED).

16. A connector according to claim 15 includes a flasher unit and power supply for the light emitting diode (LED).

* * * * *